(12) United States Patent
Shirasaki et al.

(10) Patent No.: US 12,370,773 B2
(45) Date of Patent: Jul. 29, 2025

(54) INSULATION SHEET FOR MOTOR, AND METHOD FOR PRODUCING INSULATION SHEET FOR MOTOR

(71) Applicant: Nitto Shinko Corporation, Sakai (JP)

(72) Inventors: Yuka Shirasaki, Sakai (JP); Yoshinori Kakichi, Sakai (JP); Naoto Tanonaka, Sakai (JP)

(73) Assignee: NITTO SHINKO CORPORATION, Sakai (JP)

( * ) Notice: Subject to any disclaimer, the term of this patent is extended or adjusted under 35 U.S.C. 154(b) by 109 days.

(21) Appl. No.: 18/558,602

(22) PCT Filed: Apr. 26, 2022

(86) PCT No.: PCT/JP2022/018801
§ 371 (c)(1),
(2) Date: Nov. 2, 2023

(87) PCT Pub. No.: WO2022/234787
PCT Pub. Date: Nov. 10, 2022

(65) Prior Publication Data
US 2024/0227351 A1   Jul. 11, 2024

(30) Foreign Application Priority Data

May 6, 2021   (JP) ................................ 2021-078527

(51) Int. Cl.
*B32B 7/12*   (2006.01)
*B32B 27/08*   (2006.01)
*B32B 37/12*   (2006.01)

(52) U.S. Cl.
CPC ................ *B32B 7/12* (2013.01); *B32B 27/08* (2013.01); *B32B 37/12* (2013.01); *B32B 2037/1253* (2013.01); *B32B 2250/02* (2013.01); *B32B 2250/24* (2013.01)

(58) Field of Classification Search
CPC ............ B32B 2250/24; B32B 2250/02; B32B 2037/1253; B32B 37/12; B32B 27/08; B32B 7/12
See application file for complete search history.

(56) References Cited

FOREIGN PATENT DOCUMENTS

| JP | 2006-262687 A | 9/2006 |
|---|---|---|
| JP | 2013-6999 A | 1/2013 |
| JP | 2014-102946 A | 6/2014 |
| JP | 2016-54629 A | 4/2016 |
| JP | 2016-165806 A | 9/2016 |

OTHER PUBLICATIONS

JP2014102946A; Ikenaga Hiroko (Year: 2014).*
JP2016054629A; Kihara Yasuyuki (Year: 2016).*
(Continued)

*Primary Examiner* — Vishal I Patel
(74) *Attorney, Agent, or Firm* — WHDA, LLP

(57) ABSTRACT

An insulation sheet for a motor according to present invention includes a first resin film layer and a second resin film layer that is laminated on at least one surface of the first resin layer via an adhesive buyer, in which the adhesive layer includes an acrylic polymer and a trimethylolpropane-tolylenediisocyanate trimer adduct, and has a gel fraction of 70% or lead.

4 Claims, 4 Drawing Sheets

(56) References Cited

OTHER PUBLICATIONS

JP2016165806A; Akashi Yuuka (Year: 2016).*
International Search Report dated Jul. 26, 2022, issued in counterpart International Application No. PCT/JP2022/018801 (2 pages).
Notification of Transmittal of Copies of Translation of the International Preliminary Report on Patentability (Form PCT/IB/338) issued in counterpart International Application No. PCT/JP2022/018801 mailed Nov. 16, 2023 with Forms PCT/IB/373, PCT/ISA/237 and PCT/IB/326. (10 pages).
Extended (Supplementary) European Search Report dated Mar. 18, 2025, issued in counterpart application No. 22798893.8. (7 pages).

* cited by examiner

INSULATION SHEET FOR MOTOR, AND METHOD FOR PRODUCING INSULATION SHEET FOR MOTOR

CROSS-REFERENCE TO RELATED APPLICATION

This application claims priority to Japanese Patent Application No. 2021-78527, the disclosure of which is incorporated herein by reference in its entirety.

FIELD

The present invention relates to an insulation sheet for a motor, more specifically, relates to an insulation sheet for a motor used as an insulation sheet for an oil-cooled drive motor of an automobile. The present invention also relates to a method for producing the insulation sheet.

BACKGROUND

Conventionally, an oil-cooled drive motor of an automobile includes a rotor and a stator for generating a force to rotate the rotor. The stator includes a plurality of coils and is configured to obtain a Lorentz force by causing the plurality of coils to generate a magnetic field. The stator rotates the rotor by the Lorentz force.

In the oil-cooled drive motor as described above, the coil is composed of, for example, a plurality of segment conductors connected to each other, and is generally used by being mounted on a so-called stator core or rotor core that is a member in which magnetic steel plates are laminated.

In the oil-cooled drive motor as described above, a core such as the stator core or the rotor core has a plurality of slot grooves, and the coils are housed in the plurality of slot grooves. Further, in the oil-cooled drive motor as described above, an insulation sheet for ensuring the insulation properties between the coil and an inner wall surface of the slot groove is housed together with the coil in each of the plurality of slot grooves. More specifically, the insulation sheet is housed in the slot groove in a wound state around the coil. The coil wound by the insulation sheet is fixed inside the slot groove by an insulating resin (e.g., epoxy varnish) that is impregnated in the slot groove.

The insulation sheet has a five-layer structure including, for example, as described in Patent Literature 1 below, a polyester resin layer composed of a polyester film, two paper-like sheet layers respectively disposed on the upper side and the lower side of the polyester resin layer, and two adhesive layers respectively disposed between the polyester resin layer and the paper-like sheet layers. That is, the insulation sheet has a five-layer structure with the paper-like sheet layers respectively disposed on surface layers. As described in Patent Literature 1 below, the adhesive layers include an adhesive agent including a thermosetting resin such as an epoxy resin as a main component. A finished product of the insulation sheet is produced by causing the adhesive agent to be thermally cured (for example, thermally cured at 130° C. for 24 hours) to improve the adhesive strength between the polyester resin layer and the adhesive layers and the adhesive strength between the paper-like sheets and the adhesive layers. Further, the paper-like sheet layer is composed of a paper-like sheet as described in Patent Literature 1 below, and as the paper-like sheet, for example, a so-called "aramid paper" made of wholly aromatic polyamide fiber as a main material is used.

CITATION LIST

Patent Literature

Patent Literature 1: JP 2016-54629 A

SUMMARY

Technical Problem

A demand for accuracy of the thickness in an insulation sheet is more and more increasing in recent years. Nevertheless, a paper-like sheet such as aramid paper has a thickness of about ±20 μm, the variation of which is relatively large. Therefore, the insulation sheet is not necessarily enough to meet the above demand for accuracy of the thickness. Therefore, consideration has been made on the configuration that a resin film layer composed of a resin film having a relatively small variation in the thickness of ±5 μm is disposed on a surface layer part of the insulation sheet, in place of the paper-like sheet layer.

Meanwhile, when the resin film layer is disposed on the surface layer part of the insulation sheet, wrinkles are sometimes generated in the resin film layer disposed on the surface layer part in a product of the insulation sheet with the adhesive agent included in the adhesive layer thermally cured. Wrinkles generated in the resin film layer disposed on the surface layer part of the insulation sheet are unfavorable due to the degraded appearance. Further, there is likelihood that wrinkles affect on the adhesive strength of the adhesive layer to the resin film layer disposed on the surface layer part, and therefore wrinkles are also unfavorable. Nevertheless, no sufficient consideration appears to have been made on suppressing generation of wrinkles in the resin film layer disposed on the surface layer part of the insulation sheet.

It is therefore an object of the present invention to provide an insulation sheet for a motor that is capable of suppressing generation of wrinkles in the resin film layer disposed on the surface layer part, and a method for producing the insulation sheet.

Solution to Problem

An insulation sheet for a motor according to the present invention includes:
  a first resin film layer; and
  a second resin film layer that is laminated on at least one surface of the first resin layer via an adhesive layer, in which
  the adhesive layer includes an acrylic polymer and a trimethylolpropane-tolylenediisocyanate trimer adduct, and
  a gel fraction of the adhesive layer is 70% or less.

In the insulation sheet, it is preferable that the adhesive layer include 5 parts by mass or more and 40 parts by mass or less of the trimethylolpropane-tolylenediisocyanate trimer adduct based on 100 parts by mass of the acrylic polymer.

In the insulation sheet, it is preferable that the gel fraction of the adhesive layer be 50% or more.

A method for producing the insulation sheet includes:
  a lamination step of laminating a second resin film layer on at least one surface of a first resin film layer via an adhesive layer; and a curing step of curing the adhesive layer, in which
the adhesive layer includes an acrylic polymer and a trimethylolpropane-tolylenediisocyanate trimer adduct, and in the curing step, curing at room temperature is performed to cause a gel fraction of the adhesive layer to be 70% or less.

DESCRIPTION OF EMBODIMENTS

Hereinafter, an embodiment of the present invention will be described.

Insulation Sheet

Figure 1:
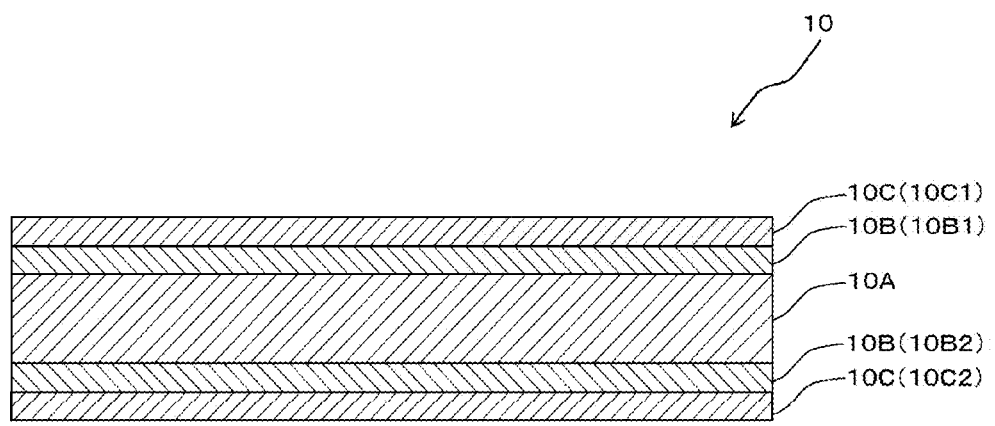
FIG. 1 is a cross-sectional view showing a structure of an insulation sheet for a motor according to an embodiment of the present invention.

An insulation sheet for a motor 10 according to this embodiment includes a first resin film layer 10A and a second resin film layer 10C that is laminated on at least one surface of the first resin layer 10A via an adhesive layer 10B. Hereinafter, the description will be given on the example in which the insulation sheet 10 according to this embodiment is formed of one first resin film layer 10A, and two second resin film layers 10C1, 10C2 laminated on both surface of the first resin film layer 10A via two adhesive layers 10B1, 10B2 as shown in FIG. 1.

The insulation sheet 10 according to this embodiment is used as an insulation sheet for an oil-cooled drive motor of an automobile. That is, the insulation sheet 10 according to this embodiment is used as an insulation sheet for a drive motor cooled by a cooling oil (e.g., ATF). Examples of the automobile include a hybrid electric vehicle (HEV) and an electric vehicle (EV). Examples of the drive motor include an HV motor, a motor generator, an alternator, a 4WD motor, an oil pump motor, an EPS motor, a compressor motor, and an in-wheel motor.

In the insulation sheet 10 according to this embodiment, the first resin film layer 10A is composed of, for example, a polyester-based film. Examples of the polyester-based film include a polyethylene terephthalate (PET) film and a polyethylene naphthalate (PEN) film. The polyethylene naphthalate film is preferably used as the polyethylene film in terms of enabling the first resin film layer 10A to have an excellent hydrolysis resistance.

The thickness of the first resin film layer 10A is preferably 50 μm or more and 250 μm or less.

The first resin film layer 10A can be composed of any one of a resin film in a stretched state and a resin film in a non-stretched state (i.e., non-stretched resin film), but is preferably composed by using a resin film in a stretched form, more preferably composed of a resin film formed by biaxially stretched. That is, the first resin film layer 10A is preferably composed by using a stretched PET or a stretched PEN, more preferably composed by using a biaxially stretched PET or a biaxially stretched PEN.

Further, when the first resin film layer 10A is composed of a polyethylene terephthalate film, the polyethylene terephthalate film is preferably composed of a low-oligomer product having an oligomer content of 1 mass % or less. The formation of the polyethylene terephthalate film by the low-oligomer product enables the first resin film layer 10A to have an excellent hydrolysis resistance. The oligomer content can be obtained by, for example, the following manner.

(1) A film sample having a substantially square shape with each side of about 5 cm is washed with methanol, followed by drying the film sample at 160° C. in a convection oven for 1 hour, to obtain an initial mass ($M_1$ (g)).

(2) An extraction treatment is performed on the film sample in a boiling xylene (about 400 mL) for 48 hours using, for example, a Soxhlet extractor.

(3) A mass ($M_2$ (g)) of the film sample after the extraction treatment is measured to calculate a ratio (($M_1-M_2$)/$M_1$) of mass reduction ($M_1-M_2$) relative to the initial mass ($M_1$).

Here, the mass reduction of the mass ($M_2$ (g)) of the film sample after the extraction treatment cannot be accurately obtained unless the xylene used in the extraction treatment is sufficiently removed from the film sample. Therefore, the measurement is preferably performed after the film sample subjected to extraction with xylene is washed with water and xylene adhering to the surface is lightly wiped off, and then the film sample is additionally dried at 160° C. in the convection oven for 8 hour, followed by cooling the film sample in a desiccator.

In the insulation sheet 10 according to this embodiment, the second resin film layers 10C1, 10C2 are composed of, for example, a polyester-based film. Examples of the polyester-based film include a polyethylene terephthalate (PET) film and a polyethylene naphthalate (PEN) film. It is particularly preferable that the second resin film layers 10C1, 10C2 be composed of polyethylene naphthalate (PEN) in terms of having an excellent hydrolysis resistance. Further, in the insulation sheet 10 according to this embodiment, the second resin film layers 10C1, 10C2 can be composed of a resin film having a better heat resistance than the polyester-based film. Examples of such a resin film include a polyimide (PI) film, a polyamide film, a polyphenylene sulfide (PPS) film, a polyether ether ketone (PEEK) film, and an ethylene-tetrafluoroethylene copolymer (ETFE) film.

The thickness of the second resin film layers 10C1, 10C2 is preferably 12 μm or more and 50 μm or less. The second resin film layer 10C1 and the second resin film layer 10C2 can have the same thickness or can have different thicknesses, but preferably have the same thickness.

The second resin film layers 10C1, 10C2 can be composed of any one of a resin film formed by stretching and a resin film formed without stretching (i.e., non-stretched resin film), but are preferably composed by using a resin film formed by stretching, more preferably composed of a resin film formed by biaxially stretching. The thickness of the second resin film layers 10C1, 10C2 is preferably smaller than the thickness of the first resin film layer 10A. The ratio of the thickness of the second resin film layers 10C1, 10C2 to the thickness of the first resin film layer 10A (i.e., thickness of the second resin film layers 10C1, 10C2/thickness of the first resin film layer 10A) T is preferably 0.05 or more, more preferably 0.08 or more. The ratio T of the thickness of the second resin film layers 10C1, 10C2 to the thickness of the first resin film layer 10A is preferably 0.2 or less, more preferably 0.15 or less.

In the insulation sheet 10 according to this embodiment, the adhesive layers 10B1, 10B2 include an acrylic polymer and a trimethylolpropane-tolylenediisocyanate trimer adduct. In the insulation sheet 10 according to this embodiment, the adhesive layers 10B1, 10B2 have a gel fraction of 70% or less. Generation of wrinkles in the second resin film layers 10C1, 10C2 can be suppressed by the adhesive layers 10B1, 10B2 configured as above.

In the insulation sheet 10 according to this embodiment, the adhesive layers 10B1, 10B2 preferably have a gel fraction of 50% or more. The gel fraction of 50% or more enables to suppress lifting or separation of the second resin film layers 10C1, 10C2 from the adhesive layers 10B1, 10B2 after being exposed to a heating environment (for example, after being exposed to a temperature environment at 150° C. for 4 hours), in addition to suppressing generation of wrinkles in the second resin film layers 10C1, 10C2.

Commercial products of the trimethylolpropane-tolylenediisocyanate trimer adduct include the product name "Coronate L" manufactured by TOSOH CORPORATION.

In the insulation sheet 10 according to this embodiment, the adhesive layers 10B1, 10B2 are cured at room temperature to improve the adhesive strength to the first resin film layer 10A and improve the adhesive strength to the second resin film layers 10C1, 10C2. Specifically, in the insulation sheet 10 according to this embodiment, the adhesive layers 10B1, 10B2 are cured at room temperature in the presence of water (that is, room temperature and moisture curing) to improve the adhesive strength to the first resin film layer 10A and improve the adhesive strength to the second resin film layers 10C1, 10C2. The room temperature curing is performed in a moisture-containing gas such as atmosphere. The room temperature herein means a temperature within a range of 5° C. or more and 35° C. or less. The room temperature curing is preferably performed for 72 hours or more. By the room temperature curing performed for 144 hours, the gel fraction can be adjusted to fall within a range of 60% or more and 70% or less. The room temperature curing is preferably performed in the environment where the absolute humidity is 0.002 kg/kg or more and 0.025 kg/kg or less. The room temperature curing is preferably performed in the environment where the water vapor content is 2.31 mg/m³ or more and 10.3 mg/m³ or less.

The gel fraction of the adhesive layers 10B1, 10B2 can be obtained in the following manner.

(1) A sample of about 0.1 g is sampled from the adhesive layer of the insulation sheet for motor.
(2) The sample obtained by the sampling is wrapped with a PTFE porous membrane (product name "NTF1122" manufactured by Nitto Denko Corporation) having a diameter of 0.2 μm and then bound with a kite string.
(3) The sample wrapped with the PTFE porous membrane is immersed in 50 mL ethyl acetate and allowed to stand at room temperature (23±2° C.) for 1 week.
(4) After allowed to stand for 1 week, the sample wrapped with the PTFE porous membrane is removed from the 50 mL ethyl acetate and dried at 130° C. for 2 hours to remove ethyl acetate.
(5) The sample mass before and after this operation is measured to calculate the gel fraction using the following formula. In the following formula, $W_{T2}$ represents the mass of the PTFE porous membrane after the drying, $W_{S2}$ represents the mass of the kite string after the drying, $W_G$ represents the mass of a gel content after the drying. $W_{T1}$ represents the initial mass of the PTFE porous membrane, $W_{S1}$ represents the initial mass of the kite string, and $W_A$ represents the initial mass of the sample.

$$\text{Gel fraction (\%)} = \{(W_{T2}+W_{S2}+W_G)-(W_{T1}+W_{S1})\}/\{(W_{T1}+W_{S1}+W_A)-(W_{T1}+W_{S1})\} \times 100$$

In the insulation sheet 10 according to this embodiment, the adhesive layer 10B (i.e., adhesive layers 10B1, 10B2 in the example shown in FIG. 1) is configured to include the acrylic polymer and the trimethylolpropane-tolylenediisocyanate trimer adduct, and further configured to set the gel fraction of the adhesive layer 10B to 70% or less. Thereby, generation of wrinkles in the second resin film layer 10C (i.e., second resin film layers 10C1, 10C2 in the example shown in FIG. 1) can be suppressed. The present inventors presume the reason for it as below.

Trimethylolpropane/tolylenediisocyanate has three isocyanate groups (—NCO) in the molecular structure. The isocyanate group in the trimethylolpropane/tolylenediisocyanate is assumed to, in the conditions at room temperature in the presence of water, react with water to form a urethane group (—NHCOOH), while having $CO_2$ desorbed from a part of the urethane group to form an amide group (—NH$_2$). That is, as the trimethylolpropane/tolylenediisocyanate, that having the isocyanate group turned into a urethane group (hereinafter, referred to as a urethane group-containing trimethylolpropane/tolylenediisocyanate) and that having the isocyanate group turned into an amide group (hereinafter, referred to as an amide group-containing trimethylolpropane/tolylenediisocyanate) are assumed to coexist in the adhesive layer 10B in the insulation sheet 10 according to this embodiment. In such a situation, a polymer of trimethylolpropane/tolylenediisocyanate is assumed to be formed in the adhesive layer 10B by repeated polymerization of the urethane group of the urethane group-containing trimethylolpropane/tolylenediisocyanate and the amide group of the amide group-containing trimethylolpropane/tolylenediisocyanate via a urea bond (—NHC(O)NH—). Here, nitrogen atoms (N) and oxygen atoms (O) in the urea bond function as an acceptor when forming a hydrogen bond. That is, the urea bond functions as a hydrogen acceptor. On the other hand, the acrylic polymer has a carboxyl group (—COOH) in the molecular structure, and the carboxyl group functions as a donor when forming the hydrogen bond. That is, the carboxyl group functions as a hydrogen donor. In the adhesive layer 10B, the hydrogen bond is assumed to be formed by the urethane bond (i.e., hydrogen acceptor) in the polymer of trimethylolpropane/tolylenediisocyanate and the carboxyl group (i.e., hydrogen donor) in the acrylic polymer. That is, the acrylic polymer in the adhesive layer 10B of the insulation sheet 10 according to this embodiment is assumed to be bound to the polymer of the trimethylolpropane/tolylenediisocyanate with the hydrogen bond, to thereby cause the curing reaction to proceed. Therefore, it is assumed that the gel fraction is relatively low, namely 70% or less, in the adhesive layer 10B of the insulation sheet 10 according to this embodiment because the formation of chemical bonds (i.e., covalent bonds) of the molecules is suppressed, while a number of pseudo cross-links by the hydrogen bond are formed, compared to the adhesive layer in which the curing reaction by thermosetting proceeds. As a result, it is assumed that an excessive contraction of the adhesive layer 10B is suppressed in the insulation sheet 10 according to this embodiment even after the curing reaction has proceeded. The suppression of the excessive contraction of the adhesive layer 10B enables the suppression of generation of wrinkles in the second resin film layer 10C (i.e., second resin film layers 10C1, 10C2 in the example shown in FIG. 1) disposed on the surface layer part.

In the insulation sheet 10 according to this embodiment, the adhesive layers 10B1, 10B2 preferably include 5 parts by mass or more and 40 parts by mass or less of the trimethylolpropane-tolylenediisocyanate trimer adduct based on 100 parts by mass of the acrylic polymer. In the insulation sheet 10 according to this embodiment, the adhesive layers 10B1, 10B2 more preferably include 10 parts by mass or more and 35 parts by mass or less of the trimethylolpropane-tolylenediisocyanate trimer adduct based on 100 parts by mass of the acrylic polymer. The content of the trimethylolpropane-tolylenediisocyanate trimer adduct within the above ranges enables to produce a high cohesive force in the adhesive layers 10B1, 10B2, thereby suppressing generation of wrinkles in the second resin film layers 10C1, 10C2, and in addition, enables to suppress lifting or separation of the second resin film layers 10C1, 10C2 from the adhesive layers 10B1, 10B2 after the exposure to the heating environment (for example, after the exposure to the temperature environment at 150° C. for 4 hours).

The adhesive layer 10B1 can be formed by applying an adhesive composition including an acrylic polymer and a trimethylolpropane-tolylenediisocyanate trimer adduct to at least one of the first resin film layer 10A and the second resin film layer 10C1, and bonding the first resin film layer 10A and the second resin film layer 10C1 to allow a surface applied with the adhesive composition to face inside. The adhesive layer 10B2 can also be formed by bonding the first resin film layer 10A and the second resin film layer 10C2 in the same manner as described above.

The amount of the adhesive composition coated for forming one layer out of the adhesive layers 10B1, 10B2 is preferably 5 to 50 g/m². By setting the application amount to the above numerical range, it is possible to allow the adhesive layers 10B1, 10B2 to have a relatively small thickness, while obtaining a sufficient adhesive strength between the second resin film layers 10C1, 10C2 and the first resin film layer 10A. Thereby, the insulation sheet 10 according to this embodiment becomes easy to be located in a tight space.

The thickness of the adhesive layers 10B1, 10B2 is preferably 4 μm or more and 50 μm or less. The adhesive layer 10B1 and the adhesive layer 10B2 can have the same thickness or can have different thicknesses, but preferably have the same thickness.

As the acrylic polymer, for example, a homopolymer of a monomer represented by formula (1) below or a copolymer having the aforementioned monomer as a structural unit can be used.

[Formula 1]

(1)

wherein R1 is a hydrogen atom or a lower alkyl group and R2 is a 1-12C alkyl group.

Specific examples of the acrylic polymer include one of, or a combination of two or more of: polyacrylic acid ester, such as polymethyl acrylate, polyethyl acrylate, and polybutyl acrylate; polymethacrylic acid ester such as polymethyl methacrylate, polyethyl methacrylate, and polybutyl methacrylate; and a copolymer such as an ethylene-acrylic acid ester copolymer, an ethylene-acrylic acid ester-acrylic acid copolymer, a styrene-methacrylic acid ester-acrylic acid copolymer, an acrylic acid ester-vinyl chloride copolymer, an acrylic acid ester-acrylic acid copolymer, a methacrylic acid ester-vinyl chloride copolymer, a styrene-methacrylic acid ester-butadiene copolymer, and a methacrylic acid ester-acrylonitrile copolymer.

In the insulation sheet according to this embodiment, the adhesive layers 10B1, 10B2 preferably include polybutyl acrylate (PBA) among the aforementioned acrylic polymers.

The adhesive layers 10B1, 10B2 can include various known additives. Examples of the additives also include a dispersant, an anti-aging agent, an antioxidant, a processing aid, a stabilizer, a defoamer, a flame retardant, a thickener, and a pigment. In the insulation sheet 10 according to this embodiment, the adhesive layers 10B1, 10B2 can include no tackifier.

In general, in the adhesive layer that is thermally cured to improve the adhesive strength to the resin film layer, the gel fraction after the adhesive layer is thermally cured is 90% or more and the curing reaction sufficiently proceeds in the adhesive layer. Therefore, the storage elastic modulus of the adhesive layer is excessively increased unless the tackifier is not included in the adhesive layer. When the storage elastic modulus of the adhesive layer is excessively increased, the adhesive layer accordingly becomes relatively hard and often has a reduced tackiness. In view of the above, the tackifier is generally included in the adhesive layer that is thermally cured to be used, in terms of suppressing the reduction in tackiness.

In contrast to this, in the insulation sheet 10 according to this embodiment, the adhesive layers 10B1, 10B2 are cured at room temperature (specifically, room temperature and moisture curing) to improve the adhesive strength to the second resin film layers 10C1, 10C2 and the like, and the gel fraction of the adhesive layers 10B1, 10B2 is relatively low, namely 70% or less, as described above. Therefore, the adhesive layers 10B1, 10B2 in the insulation sheet 10 according to this embodiment show a relatively low storage elastic modulus even with no tackifier compared to the adhesive layer that is thermally cured to be used. In the insulation sheet 10 according to this embodiment, the adhesive layers 10B1, 10B2 are suppressed from having a reduced tackiness by such an amount as they show a relatively low storage elastic modulus. For the aforementioned reasons, it is considered that the adhesive layers 10B1, 10B2 in the insulation sheet 10 according to the present embodiment can exhibit such a sufficient tackiness as to improve the adhesive strength to the second resin film layers 10C1, 10C2 and the like even with no tackifier.

(Method for Producing an Insulation Sheet for a Motor)

Figure 2:
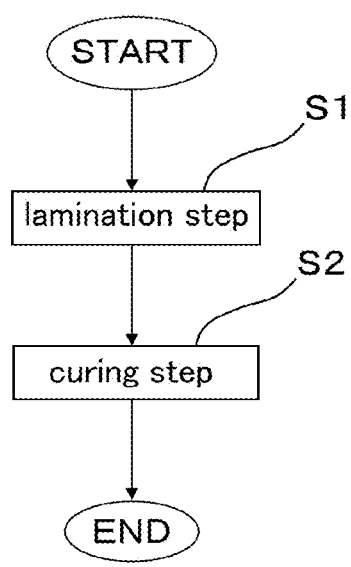
FIG. 2 is a flow diagram of a method for producing the insulation sheet according to an embodiment of the present invention.

As shown in FIG. 2, the method for producing an insulation sheet according to this embodiment includes a lamination step S1 of laminating the second resin film layer 10C on at least one surface of the first resin film layer 10A via the adhesive layer 10B, and a curing step S2 of curing the adhesive layer 10B. In the method for producing the insulation sheet according to this embodiment, the adhesive layer 10B includes an acrylic polymer and a trimethylolpropane-tolylenediisocyanate trimer adduct. In the method for producing the insulation sheet according to this embodiment, curing at room temperature is performed to cause a gel fraction of the adhesive layer 10B to become 70% or less.

<Lamination Step S1>

The lamination step S1 can be performed by, for example, applying an adhesive composition including an acrylic polymer and a trimethylolpropane-tolylenediisocyanate trimer adduct to at least one surface of the first resin film layer 10A to form at least one adhesive layer 10B, and then bonding one surface of the second resin film layer 10C to the at least one adhesive layer 10B. Alternatively, the lamination step S1 can be performed by, for example, applying the adhesive composition to one surface of at least one second resin film layer 10C to form the adhesive layer 10B, and then bonding at least one surface of the first resin film layer 10A to the adhesive layer 10B.

<Curing Step S2>

In the curing step S2, the adhesive layer 10B is cured at room temperature to cause the adhesive layer 10B to have a gel fraction of 70% or less. Specifically, the adhesive layer 10B is caused to have a gel fraction of 70% or less by curing at room temperature performed in the presence of water (that is, room temperature and moisture curing). As noted above, room temperature herein means a temperature within a range of 5° C. or more and 35° C. or less. As described above, the room temperature curing is preferably performed for 72 hours or more. The room temperature curing performed for 72 hours or more makes it easy to adjust the gel fraction of the adhesive layer 10B to 70% or less. By the room temperature curing performed for 144 hours, the gel fraction can be adjusted within a range of 60% or more and 70% or less. Also as described above, the room temperature curing is preferably performed in the environment where the absolute humidity is 0.002 kg/kg or more and 0.025 kg/kg or less. Further, as described above, the room temperature curing is preferably performed in the environment where the water vapor content is 2.31 mg/m$^3$ or more and 10.3 mg/m$^3$ or less. The room temperature curing in the above environment makes it easy to adjust the gel fraction of the adhesive layer 10B to 70% or less.

The curing step S2 can be performed in the state where the insulation sheet is wound into a roll shape. Specifically, the curing step S2 can be performed by causing the insulation sheet wound into a roll shape to be cured at room temperature in the presence of water (that is, room temperature and moisture curing). When the curing step S2 is performed in the state where the insulation sheet is wound into a roll shape, the curing step S2 can be performed while the insulation sheet is wound with an interleaf interposed therebetween. Since the interposed interleaf causes a gap in the wound insulation sheet, water (e.g., water in the atmosphere) can be supplied to the inside of the insulation sheet. This makes it possible to sufficiently progress the room temperature curing across the entire insulation sheet. Further, the curing step S2 can be performed in the state where the insulation sheet is wound into a roll shape after allowing inorganic particles having an average particle size ($D_{50}$) of 0.1 μm or more and 3 μm or less to be adhered to the surface of the insulation sheet. A gap can also be caused in the wound insulation sheet by allowing inorganic particles having an average particle size ($D_{50}$) of 0.1 μm or more and 3 μm or less to be adhered to the surface of the insulation sheet, which makes it possible to sufficiently progress the room temperature curing across the entire insulation sheet.

The insulation sheet 10 according to this embodiment is used for oil-cooled drive motor of an automobile as described above. Hereinafter, a specific example of use of the insulation sheet 10 according to this embodiment will be described with reference to FIGS. 3 to 5. The following description will be given by taking, for example, a case where the oil-cooled drive motor is used as an oil-cooled drive motor of a hybrid vehicle or an electric vehicle.

The oil-cooled drive motor includes a rotor that includes a permanent magnet and a stator that includes a coil, the coil being formed of a segment conductor. The insulation sheet 10 according to this embodiment is used for insulation between the coil and the core in the stator.

Figure 3:
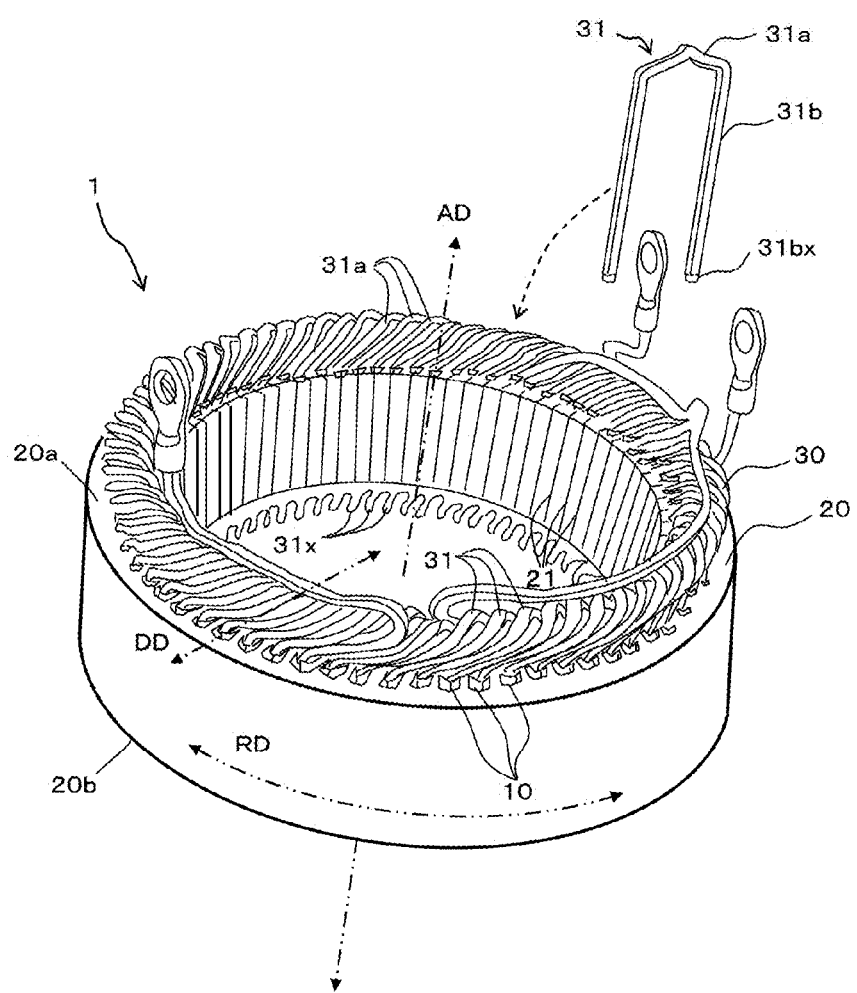
FIG. 3 is a schematic perspective view of a stator of an oil-cooled drive motor of a hybrid electric vehicle (HEV) or an electric vehicle (EV).
Figure 4:
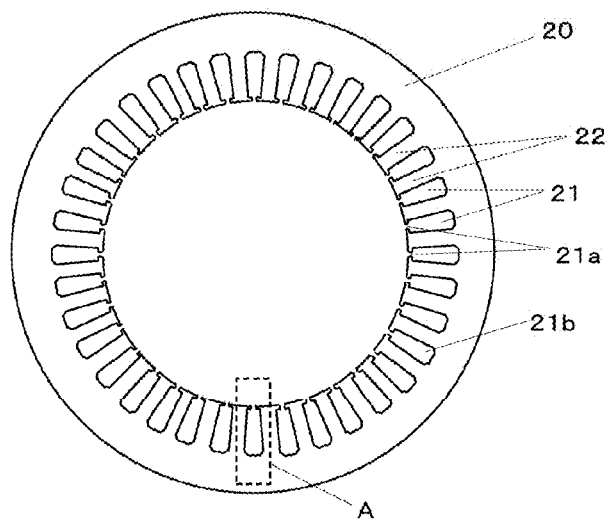
FIG. 4 is a schematic plan view of a stator core.
Figure 5:
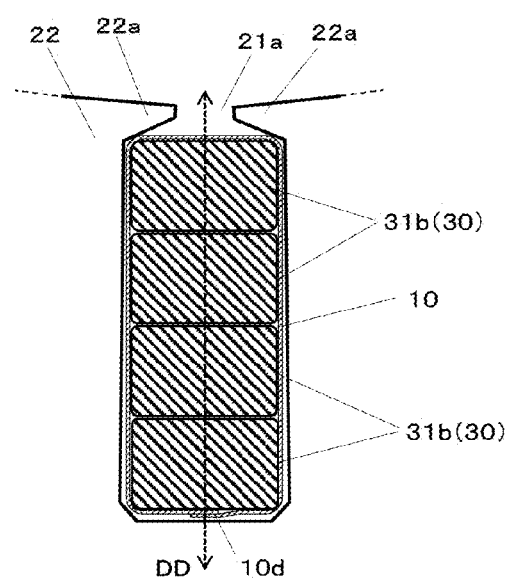
FIG. 5 is an enlarged view of an area A in FIG. 4.

FIG. 3 is a perspective view of a stator 1 of the oil-cooled drive motor. As shown in this Figure, the stator 1 includes a stator core 20 and a coil 30. FIG. 4 is a plan view of the stator 1 when viewed from a rotation axis direction (i.e., arrow AD) of the rotor (not shown). FIG. 5 is a cross-sectional view showing the state where a plurality of coils 30 are housed in an area A of the stator core 20 shown in FIG. 4.

As shown in these Figures, a plurality of slot grooves 21 are formed in an inner peripheral surface of the cylindrically shaped stator core 20 in the stator 1. The stator 1 includes the stator core 20 and the plurality of coils 30 housed in the plurality of slot grooves 21 that are formed in the stator core 20. The plurality of slot grooves 21 are arranged in the stator core 20 at constant intervals in a circumferential direction (i.e., RD in FIG. 3) of the stator core 20, while extending along the rotation axis direction (i.e., AD in FIG. 3) of the stator core 20. The slot grooves 21 are formed across the entire length in the rotation axis direction AD of the stator core 20. Openings 21b each having the same shape as the cross sectional shape of each of the slot grooves 21 are formed in one end surface 20a (i.e., upper side in FIG. 3, hereinafter also referred to as "upper end surface 20a") of the stator core 20 and another end surface 20b (hereinafter also referred to as "lower end surface 20b").

As the plurality of slot grooves 21 are aligned in the stator core 20 as described above, each of the spaces between adjacent slot grooves 21 forms a plate-shaped protrusion 22. A plurality of the plate-shaped protrusions 22 (hereinafter also referred to as "teeth 22") are formed to protrude inward in the radial direction (i.e., DD direction in FIG. 3) of the stator core 20. Note that, as shown in FIG. 4 and FIG. 5, a distal end in the protruding direction of each of the teeth 22 has a large width part 22a extending in the circumferential direction RD of the stator core 20 and has a T-shaped cross section. Therefore, the width of each of the slot gloves 21 is narrowed on the inner peripheral surface side of the stator core 20 to have a small dimension of the linear-shaped opening 21a.

The coil 30 is composed of a plurality of segment conductors 31 connected to each other. Each segment conductor 31 before the formation of the coil, as shown in FIG. 3, is a flat enameled wire subjected to bending processing into a U-shape and has two legs 31b and a head 31a that connects the two legs 31b to each other.

The segment conductor 31 has a copper wire-exposed part with an insulating film removed at a distal end 31bx of each of the legs 31b on the opposite side of the head 31. The coil 30 is produced by inserting the legs 31b from the openings 21b of the slot grooves 21 on the upper end surface 20a of the stator core 20, exposing the distal ends 31bx from the lower end surface 20b of the stator core 20, then electrically connecting the legs 31b of one and other of the segment conductors 31 to form a connection part 31x, and further subjecting the connection part 31x to an insulation treatment. The two legs 31b of one segment conductor 31 are inserted into different slot grooves 21, respectively.

Since the coil 30 is produced as described above, the stator 1 has an upper coil end part on the side of the upper end surface 20a of the stator core 20 composed of the beads 31a of the segment conductor 31, and a lower coil end part on the side of the lower end surface 20b composed of the connection part 31x formed of the legs 31b connected to each other.

As shown in FIG. 5, four legs 31b of the segment conductor 31 for forming the coil 30 are housed in each slot groove 21 of the stator core 20 (i.e., legs 31b on one side of the four segment conductors 31 are housed), and each of the slot grooves 21 houses a total of four legs 31b aligned in a row from the inner peripheral surface side toward the outer peripheral surface side.

As shown in FIG. 5, the insulation sheet 10 according to this embodiment is interposed between the four legs 31b and the inner peripheral surface of the slot groove 21. The insulation sheet 10 is longitudinally attached in the longitudinal direction of the legs 31b of the segment conductor 31 and disposed in the slot groove 21 to be wound around the four legs 31b by one or more rounds. The insulation sheet 10 is also disposed in the slot groove 21 to have both ends in the rotation axis direction AD of the insulation sheet 10 outwardly protruding from the upper end surface 20a and the lower end surface 20b of the stator core 20. The insulation sheet 10 which is, as described above, disposed in the slot groove 21 to be wound around the four legs 31b by one or more rounds has both ends in the circumferential direction overlapped with each other and disposed in the slot groove 21. That is, in the stator 1, an overlapped portion 10d in which portions of the insulation sheet 10 are overlapped with each other is formed in the slot groove 21 (see FIG. 5). As shown in FIG. 5, the overlapped portion 10d is located in the stator 1 on the outside in the radial direction DD. The portions protruding respectively from the upper end surface 20a and the lower end surface 20b of the stator core 20 in the rotation axis direction AD can be bent toward the outside of the slot groove 21 so as to be caught to (so as to be engaged by) at least one of the upper end side and the lower end side of the slot groove 21.

An insulating resin (e.g., epoxy varnish) is impregnated into the slot groove 21 to cause the coil 30 wound by the insulation sheet 10 to be fixed to the inside of the slot groove 21 by the insulating resin.

The matters disclosed herein include the following.

(1)
An insulation sheet for a motor including:
a first resin film layer; and
a second resin film layer that is laminated on at least one surface of the first resin layer via an adhesive layer, in which
the adhesive layer includes an acrylic polymer and a trimethylolpropane-tolylenediisocyanate trimer adduct, and
a gel fraction of the adhesive layer is 70% or less.

According to this configuration, the insulation sheet can suppress generation of wrinkles in the second resin film layer disposed in a surface layer part.

(2)
The insulation sheet according to the above (1), in which the adhesive layer includes 5 parts by mass or more and 40 parts by mass or less of the trimethylolpropane-tolylenediisocyanate trimer adduct based on 100 parts by mass of the acrylic polymer.

According to this configuration, the insulation sheet can suppress lifting or separation of the second resin film layer from the adhesive layer after being exposed to a heating (for example, after being exposed to a temperature environment at 150° C. for 4 hours), in addition to suppressing generation of wrinkles in the second resin film layer disposed in the surface layer part.

(3)
The insulation sheet according to the above (1) or (2), in which the gel fraction of the adhesive layer is 50% or more.

According to this configuration, the insulation sheet can suppress lifting or separation of the second resin film layer from the adhesive layer after being exposed to a heating (for example, after being exposed to a temperature environment at 150° C. for 4 hours), in addition to suppressing generation of wrinkles in the second resin film layer disposed in the surface layer part.

(4)
A method for producing an insulation sheet for a motor including:
a lamination step of laminating a second resin film layer on at least one surface of a first resin film layer via an adhesive layer; and
a curing step of curing the adhesive layer, in which
the adhesive layer includes an acrylic polymer and a trimethylolpropane-tolylenediisocyanate trimer adduct, and
in the curing step, curing at room temperature is performed to cause a gel fraction of the adhesive layer to be 70% or less.

According to this configuration, it is possible to obtain an insulation sheet for a motor that can suppress generation of wrinkles in the second resin film layer disposed in the surface layer part.

The insulation sheet and the method for producing the insulation sheet according to the present invention are not limited to the aforementioned embodiments. Further, the insulation sheet and the method for producing the insulation sheet according to the present invention are not limited also to the aforementioned operational effects. In the insulation sheet and the method for producing the insulation sheet according to the present invention, various modifications can be made without departing from the gist of the present invention.

EXAMPLES

Next, the present invention will be described in more detail by way of Examples and Comparative Examples. The following examples are provided for more specifically describing the present invention, and do not intend to limit the scope of the present invention.

Example 1

A sheet (i.e., sheet having a five-layer structure) formed of layers laminated in the following order was produced as an insulation sheet for a motor according to Example 1.
Polyethylene naphthalate resin layer (i.e., second resin film layer: thickness of 16 μm)
Acrylic polymer layer (adhesive layer: thickness of 15 μm)
Polyethylene terephthalate resin layer (first resin film layer: thickness of 188 μm)
Acrylic polymer layer (adhesive layer: thickness of 15 μm)
Polyethylene naphthalate resin layer (second resin film layer: thickness of 16 μm)

The thickness of the insulation sheet according to Example 1 was 250 μm. In the insulation sheet according to Example 1, the acrylic polymer layer (adhesive layer) was formed by applying a first adhesive composition on both surfaces of the polyethylene terephthalate resin layer (first resin film layer) to have a thickness of 15 μm. The first adhesive composition was obtained by adding 1 part by mass of the trimethylolpropane-tolylenediisocyanate trimer adduct (product name "Coronate L" manufactured by TOSOH CORPORATION) to 100 parts by mass of polybutyl acrylate (PBA) as an acrylic polymer. The application amount of the first adhesive composition was 50 g/m². In Example 1, room temperature aging (i.e., room temperature curing) was adopted as the aging conditions (i.e., curing conditions). Specifically, the aging time (i.e., curing time) adopted herein was 72 hours in addition to the adoption of a temperature at 35° C. and a water vapor content at 2.31 mg/m³. That is, the acrylic polymer layer serving as the adhesive layer in the insulation sheet according to Example 1 was cured at room temperature.

Example 2

A laminating sheet having a five-layer structure was prepared in the same manner as Example 1 as an insulation sheet for a motor according to Example 2. Also in Example 2, the thickness of the polyethylene naphthalate resin layer serving as the second resin film layer was 16 μm, the thickness of the acrylic polymer layer serving as the adhesive layer was 15 μm, and the thickness of the polyethylene terephthalate resin layer serving as the first resin film layer was 188 μm to have a thickness of the insulation sheet being 250 μm. In the insulation sheet according to Example 2, the acrylic polymer layer (adhesive layer) was formed by applying a second adhesive composition on both surfaces of the polyethylene terephthalate resin layer (first resin film layer) to have a thickness of 15 μm. The second adhesive composition was obtained by adding 2 parts by mass of Coronate L to 100 parts by mass of polybutyl acrylate (PBA). The application amount of the second adhesive composition was 50 g/m². The aging conditions adopted for Example 2 were the same as in Example 1. That is, the acrylic polymer layer serving as the adhesive layer in the insulation sheet according to Example 2 was also cured at room temperature.

Example 3

A laminating sheet having a five-layer structure was prepared in the same manner as Example 1 as an insulation sheet for a motor according to Example 3. Also in Example 3 the thickness of the polyethylene naphthalate resin layer serving as the second resin film layer was 16 μm, the thickness of the acrylic polymer layer serving as the adhesive layer was 15 μm, and the thickness of the polyethylene terephthalate resin layer serving as the first resin film layer was 188 μm to have a thickness of the insulation sheet being 250 μm. In the insulation sheet according to Example 3, the acrylic polymer layer (adhesive layer) was formed by applying a third adhesive composition on both surfaces of the polyethylene terephthalate resin layer (first resin film layer) to have a thickness of 15 μm. The third adhesive composition was obtained by adding 3 parts by mass of Coronate L to 100 parts by mass of polybutyl acrylate (PBA). The application amount of the third adhesive composition was 50 g/m². The aging conditions adopted for Example 3 were the same as in Example 1. That is, the acrylic polymer layer serving as the adhesive layer in the insulation sheet according to Example 3 was also cured at room temperature.

Example 4

A laminating sheet having a five-layer structure was prepared in the same manner as Example 1 as an insulation sheet for a motor according to Example 4. Also in Example 4, the thickness of the polyethylene naphthalate resin layer serving as the second resin film layer was 16 μm, the thickness of the acrylic polymer layer serving as the adhesive layer was 15 μm, and the thickness of the polyethylene terephthalate resin layer serving as the first resin film layer was 188 μm to have a thickness of the insulation sheet being 250 μm. In the insulation sheet according to Example 4, the acrylic polymer layer (i.e., adhesive layer) was formed by applying a fourth adhesive composition on both surfaces of the polyethylene terephthalate resin layer (first resin film layer) to have a thickness of 15 μm. The fourth adhesive composition was obtained by adding 10 parts by mass of Coronate L to 100 parts by mass of polybutyl acrylate (PBA). The application amount of the fourth adhesive composition was 50 g/m². The aging conditions adopted for Example 4 were the same as in Example 1. That is, the acrylic polymer layer serving as the adhesive layer in the insulation sheet according to Example 4 was also cured at room temperature.

Example 5

A laminating sheet having a five-layer structure was prepared in the same manner as Example 1 as an insulation sheet for a motor according to Example 5. Also in Example 5, the thickness of the polyethylene naphthalate resin layer serving as the second resin film layer was 16 μm, the thickness of the acrylic polymer layer serving as the adhesive layer was 15 μm, and the thickness of the polyethylene terephthalate resin layer serving as the first resin film layer was 188 μm to have a thickness of the insulation sheet being 250 μm. In the insulation sheet according to Example 5, the acrylic polymer layer (adhesive layer) was formed by applying a fifth adhesive composition on both surfaces of the polyethylene terephthalate resin layer (first resin film layer) to have a thickness of 15 μm. The fifth adhesive composition was obtained by adding 20 parts by mass of Coronate L to 100 parts by mass of polybutyl acrylate (PBA). The application amount of the fifth adhesive composition was 50 g/m². The aging conditions adopted for Example 5 were the same as in Example 1. That is, the acrylic polymer layer serving as the adhesive layer in the insulation sheet according to Example 5 was also cured at room temperature.

Example 6

A laminating sheet having a five-layer structure was prepared in the same manner as Example 1 as an insulation sheet for a motor according to Example 6. Also in Example 6, the thickness of the polyethylene naphthalate resin layer serving as the second resin film layer was 16 μm, the thickness of the acrylic polymer layer serving as the adhesive layer was 15 μm, and the thickness of the polyethylene terephthalate resin layer serving as the first resin film layer was 188 μm to have a thickness of the insulation sheet being 250 μm. In the insulation sheet according to Example 6, the acrylic polymer layer (i.e., adhesive layer) was formed by applying a sixth adhesive composition on both surfaces of the polyethylene terephthalate resin layer (first resin film layer) to have a thickness of 15 μm. The sixth adhesive composition was obtained by adding 35 parts by mass of Coronate L to 100 parts by mass of polybutyl acrylate (PBA). The application amount of the sixth adhesive composition was 50 g/m². The aging conditions adopted for Example 6 were the same as in Example 1. That is, the acrylic polymer layer serving as the adhesive layer in the insulation sheet according to Example 6 was also cured at room temperature.

Comparative Example 1

A laminating sheet having a five-layer structure was prepared in the same manner as Example 1 as an insulation sheet for a motor according to Comparative Example 1. Also in Comparative Example 1, the thickness of the polyethylene naphthalate resin layer serving as the second resin film layer was 16 μm, the thickness of the acrylic polymer layer serving as the adhesive layer was 15 μm, and the thickness of the polyethylene terephthalate resin layer serving as the first resin film layer was 188 μm to have a thickness of the insulation sheet being 250 μm. In the insulation sheet according to Comparative Example 1, the acrylic polymer layer (adhesive layer) was formed by applying a seventh adhesive composition on both surfaces of the polyethylene terephthalate resin layer (first resin film layer) to have a thickness of 15 μm. The seventh adhesive composition being obtained by adding 10 parts by mass of Coronate L to 100 parts by mass of polybutyl acrylate (PBA). The application amount of the seventh adhesive composition was 50 g/m². In Comparative Example 1, heating aging was adopted as the aging conditions. Specifically, the aging time adopted herein was 24 hours with a temperature set at 130° C. and without adjusting the water vapor content. That is, the acrylic polymer layer serving as the adhesive layer in the insulation sheet according to Comparative Example 1 was thermally cured.

<Gel Fraction>

A gel fraction of the acrylic polymer serving as the adhesive layer was measured on the insulation sheet according to each of Examples. The gel fraction was measured in accordance with the method described in the above embodiment. The measurement result of the gel fraction is shown in Table 1 below.

<Evaluation on Appearance After Aging>

Appearance of the insulation sheet according to each of Examples after aging was evaluated. Specifically, whether or not wrinkles are generated in the polyethylene naphthalate resin layer serving as the second resin film layer of the insulation sheet according to each of Examples was visually observed. When no wrinkles was observed on the polyethylene naphthalate resin layer, it was evaluated as excellent, and when wrinkles was observed, it was evaluated as fair. The result of the evaluation of appearance after aging is shown in Table 1 below.

<Peel Strength>

A strip-shaped sample having a width of 25 mm was cut out from the insulation sheet according to each of Examples. Then, a 180 degree peel test was performed by pulling the polyethylene naphthalate resin layer (second resin film layer) from the acrylic polymer layer (adhesive layer), using a tensile tester in an environment with room temperature (23° C.) and a relative humidity of 50% RH at a test speed of 300 mm/min, to obtain a peel strength (N/25 mm). The measurement result of the peel strength is shown in Table 1 below.

<Evaluation of Appearance After Heating Test>

Appearance of the insulation sheet according to each of Examples after the heating test was evaluated. Specifically, the insulation sheet according to each of Examples was placed in an oven and heated at a temperature of 150° C. for 4 hours, and it was evaluated whether or not lifting or separation of the polyethylene naphthalate resin layer (second resin film layer) from the acrylic polymer layer (adhesive layer) was observed. When no lifting or separation of the polyethylene naphthalate resin layer (second resin film layer) from the acrylic polymer layer (adhesive layer) was observed, it was evaluated as excellent, and when lifting or separation was observed, it was evaluated as fair. The evaluation result of the appearance after the heating test is shown in Table 1 below. For the insulation sheet according to Comparative Example 1, the evaluation of appearance after the heating test was skipped since wrinkles are found in the polyethylene naphthalate resin layer (i.e., since the appearance after aging was evaluated as fair), as shown in Table 1 below.

TABLE 1

|  | Ex. 1 | Ex. 2 | Ex. 3 | Ex. 4 |
| --- | --- | --- | --- | --- |
| Parts by mass of acrylic polymer | 100 | 100 | 100 | 100 |
| Parts by mass of trimethylolpropane-tolylenediisocyanale trimer adduct | 1 | 2 | 3 | 10 |
| Aging conditions (curing conditions) | RT | RT | RT | RT |
| Gel fraction [%] | <50% | <50% | <50% | <50% |
| Evaluation of lifting or separation after aging | EXC | EXC | EXC | EXC |
| Peel strength [N/25 mm] | 6.13 | 9.08 | 8.50 | 6.17 |
| Evaluation of lifting or separation after healing test | Fair | Fair | Fair | EXC |

|  | Ex. 5 | Ex. 6 | C. Ex. 1 |
| --- | --- | --- | --- |
| Parts by mass of acrylic polymer | 100 | 100 | 100 |
| Parts by mass of trimethylolpropane-tolylenediisocyanate trimer adduct | 20 | 35 | 10 |
| Aging conditions (curing conditions) | RT | RT | Heating |
| Gel fraction [%] | 60% | 60% | 91% |
| Evaluation of lifting or separation after aging | EXC | EXC | Fair |
| Peel strength [N/25 mm] | 5.73 | 1.70 | 6.11 |
| Evaluation of lifting or separation after heating test | EXC | EXC | — |

As is evident from Table 1, the gel fraction of the acrylic polymer layer (i.e., adhesive layer) is 70% or less in all the insulation sheets according to Examples and all the evaluation results of the appearance after aging are excellent. In contrast to this, it can be seen that the gel fraction of the insulation sheet according to Comparative Example 1 is 91% and the evaluation result of the appearance after aging is fair. From this result, it can be recognized that generation of wrinkles in the second resin film layer disposed in the surface layer part can be suppressed by including the acrylic polymer and the trimethylolpropane-tolylenediisocyanate trimer adduct in the adhesive layer and setting the gel fraction of the adhesive layer to 70% or less.

Figure 6:
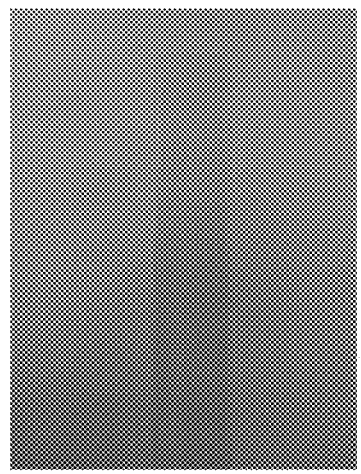
FIG. 6 is a photo showing an appearance of the insulation sheet according to Example 4 after a beating test.

Among the insulation sheets according to Examples, it can be seen that the evaluation results of the appearance after the heating test are excellent in the insulation sheets according to Examples 4 to 6. From this result, lifting or separation of the second resin film layer from the adhesive layer after the exposure in the heating environment can be suppressed by including 5 parts by mass or more and 40 parts by mass or less of the trimethylolpropane-tolylenediisocyanate trimer adduct based on 100 parts by mass of the acrylic polymer. It also can be seen that the gel fractions of the adhesive layers in the insulation sheets according to Examples 4 to 6 fall within the range of 50% or more and 70% or less, and thus lifting or separation of the second resin film layer from the adhesive layer can be suppressed by setting the gel fraction of the adhesive layer to 50% or more and 70% or less. A photo showing the appearance after heating test of the insulation sheet according to Example 4 is shown in FIG. 6. As shown in FIG. 6, no lifting or separation of the polyethylene naphthalate resin layer (second resin film layer) from the acrylic polymer layer (adhesive layer) is found in the insulation sheet according to Example 4.

<Influence of Curing Temperature and Water Vapor Content>

In order to investigate the influence of the curing temperature and the water vapor content, the transition of the gel fraction over time was checked by curing the insulation sheet according to Example 4 at the temperature and the water vapor content below.

(1) Temperature: 5° C., water vapor content: 5.17 mg/m$^3$
(2) Temperature: 23° C., water vapor content: 10.3 mg/m$^3$ The result revealed that the gel fraction of the adhesive layer becomes 50% or more and 70% or less by aging for 72 hour or more in any of the above conditions. As is evident from the results of the above Examples and this result, the gel fraction of the adhesive layer can be appropriately adjusted by setting the temperature to 5° C. or more and 35° C. or less and setting the water vapor content to 2.31 mg/m$^3$ or more and 10.3 mg/m$^3$ or less.

REFERENCE SIGNS LIST

1: Stator
10: Insulation sheet for motor
20: Stator core
21: Slot groove
22: Plate-shaped protrusion (tooth)
30: Coil
31: Segment conductor
10A: First resin film layer
10B: Adhesive layer
10B1: Adhesive layer
10B2: Adhesive layer
10C: Second resin film layer
10C1: Second resin film layer
10C2: Second resin film layer
10d: Overlapped portion
20a: End surface (upper end surface)
20b: End surface (lower end surface)
21a: Linear-shaped opening
21b: Opening
22a: Large width part
31a: Head
31b: Leg
31bx: Distal end
31x: Connection part
AD: Rotation axis direction
DD: Radial direction
RD: Circumferential direction

The invention claimed is:

1. An insulation sheet for a motor comprising:
 a first resin film layer; and
 a second resin film layer that is laminated on at least one surface of the first resin layer via an adhesive layer; wherein
 the adhesive layer comprises an acrylic polymer and a trimethylolpropane-tolylenediisocyanate trimer adduct, and
 a gel fraction of the adhesive layer is 70% or less.

2. The insulation sheet according to claim 1, wherein the adhesive layer comprises 5 parts by mass or more and 40 parts by mass or less of the trimethylolpropane-tolylenediisocyanate trimer adduct based on 100 parts by mass of the acrylic polymer.

3. The insulation sheet according to claim 1, wherein the gel fraction of the adhesive layer is 50% or more.

4. A method for producing an insulation sheet for a motor comprising:
 a lamination step of laminating a second resin film layer on at least one surface of a first resin film layer via an adhesive layer; and
 a curing step of curing the adhesive layer, wherein
 the adhesive layer comprises an acrylic polymer and a trimethylolpropane-tolylenediisocyanate trimer adduct, and
 in the curing step, curing at room temperature is performed to cause a gel fraction of the adhesive layer to be 70% or less.

* * * * *